United States Patent [19]
Westmoreland

[11] 3,740,045
[45] June 19, 1973

[54] PRECISION DISC SPRINGS
[76] Inventor: Julius C. Westmoreland, 6607 Avenida de Las Pescas, La Jolla, Calif. 92037
[22] Filed: July 19, 1971
[21] Appl. No.: 163,576

[52] U.S. Cl. .................................. 267/162, 293/60
[51] Int. Cl. ............................................... F16f 1/20
[58] Field of Search .................. 267/162, 135, 165; 293/60

[56] References Cited
UNITED STATES PATENTS

| | | | |
|---|---|---|---|
| 3,394,631 | 7/1968 | Thompson | 267/162 |
| 3,259,382 | 7/1966 | Iannce | 267/162 |
| 3,224,344 | 12/1965 | Baumonn et al. | 267/162 |
| 3,010,713 | 11/1961 | Turkovich | 267/162 |

Primary Examiner—James B. Marbert
Attorney—Max L. Libman

[57] ABSTRACT

A disc spring arrangement utilizing the axial resilience of two parallel annular disc spring elements held apart a fixed (but adjustable) distance at two adjacent circular disc circumferences, the other two circular edges being free to move away from each other under the influence of blunt wedge means acting radially on said free edges under the influence of a cam actuator, and reacting in turn on the wedges when the cam actuator is moved back to its initial position. The new disc spring is adapted for use in a wide range of applications requiring large loading capacity, and can be stacked to give a greater throw, and can also readily be made self-locking in either extreme position of the cam actuator to operate as a snap-lock device.

9 Claims, 12 Drawing Figures

PATENTED JUN 19 1973

INVENTOR
Julius C. Westmoreland

BY  Max L. Libman

ATTORNEY

INVENTOR
Julius C. Westmoreland

BY  *Max L. Libman*

ATTORNEY

INVENTOR
Julius C. Westmoreland

BY Max L. Libman

ATTORNEY

PRECISION DISC SPRINGS

Heretofore, the Belleville spring has been employed principally in applications requiring the characteristic large loading capacity afforded by a disc spring. However, such springs are difficult to design and fabricate, and generally have a very short life due to high stresses and fatigue. It is a major purpose of the present invention to open new vistas for the application of disc springs through significant improvement in performance and accuracy, longer life, and simpler precise fabrication techniques. Disc springs of improved reliability and life can find expanding areas of application in many fields of use, for example, snap-lock and latching operations, compensating spring application, clutch springs, brake springs, safety valves, etc.

In a typical form of the invention, two parallel spring discs are held a fixed distance apart at their outer adjacent circumferences, while their inner adjacent edges, which are free to flex, are engaged by a plurality of wedge devices, typically ball bearing elements having a diameter greater than the fixed distance between said free edges, and spaced circumferentially at intervals around said inner edges; an axially movable cam element is employed to urge the ball bearings radially outward so that they tend to spring the spring edges of the parallel discs apart by a distance less than the diameter of the ball bearings, so that when the cam actuator is returned to its initial position, the spring action of the disc edges on the balls forces them also back radially into their initial position.

The specific nature of the invention, as well as other objects and advantages thereof, will clearly appear from a description of a preferred embodiment as shown in the accompanying drawings, in which.

Figure 1:
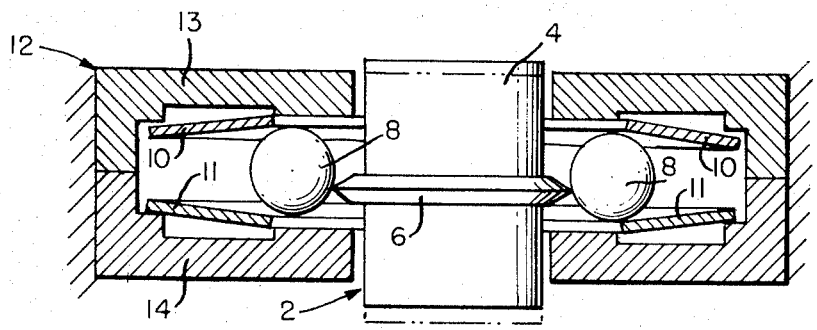
FIG. 1 is a schematic transverse sectional view of a device embodying the invention and showing its principle of operation.

FIG. 1 shows the principle of the present invention, where part 2 represents the cam actuator comprising a shaft 4 having fixed thereto a symmetrical angle cam surface element 6 which engages a complete series of ball bearings 8 located at its periphery, and these balls in turn form an inner simple support for two flat spring washers 10 and 11 held within a housing 12 which may conveniently be formed of two machined elements 13 and 14 held together by any suitable means such as screws or welding (not shown). The housing 12 is so formed as to restrain the outer edges of the washers 10 and 11 from moving further apart from each other when a spreading force is applied to the inner edges by the ball bearings moving radially outward; this occurs, of course, when the shaft 2 is moved axially upward as shown in the Figure with respect to the casing 12, thus spreading the inner edges of the two spring washers 10 and 11 further apart. If the cam actuator 6 is moved only a very short distance, then the spring action of the distorted washers 10 and 11 tends to push the shft 4 back into its original position; however, if the motion is sufficiently great so that the cam passes over the center plane of the ball bearings, onto the other side, then the arrangement functions as a snap-lock spring and tends to remain in that position until the restoring force is applied to the shaft 4. In this case, a symmetrical force-displacement characteristic is achieved in two directions but of opposite sign.

The theory of this new precision disc spring is based on a simple mechanical transformation of the large elastic force produced by the small deflection of a flat washer into a moderate, more applicable force acting over a much larger displacement. This transformation is produced by the ball-cam arrangement shown in FIG. 1. The cam surface shown here is essentially a part of the base section of a double cone arrangement which permits the spring force to reverse in sign as the actuator is pressed through the center line of the ball bearings. This is thus similar to the classical action of a Belleville spring; however, in the present case the load-deflection characteristic is achieved without the incurrence of large detrimental stresses in the structural members, thus permitting many operations of this type of spring to ccur over a significantly longer period of time than is possible with the Belleville spring type of action.

In the present arrangement, the cam surface may be shaped to provide a preferred force-displacement characteristic, and along with the known elastic behavior of flat washers the geometry of the contact points and angles may be selected to fix the magnitude of points on this curve. The precision of operation is achieved primarily through the control of dimensions in fabrication and as a result of the elastic behavior of the washers which can readily be made in a stress-free state. In this manner the purposes of the invention can be accomplished by providing a mass-produced disc spring.

Figure 2:
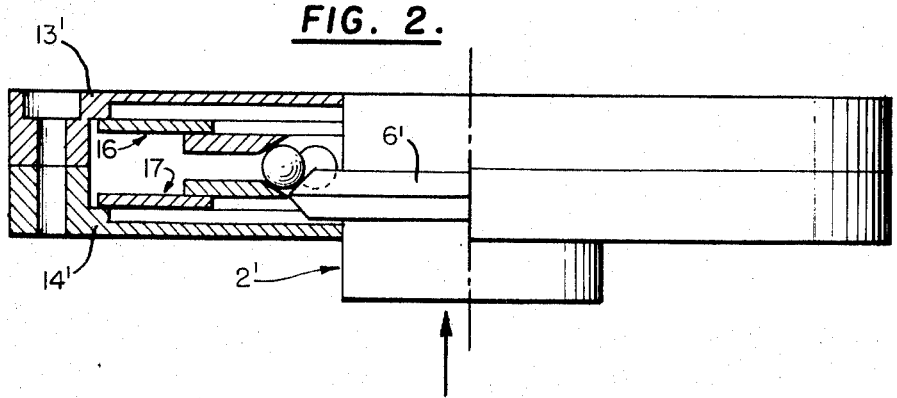
FIG. 2 is a similar view of a slightly modified form of the invention employing compound or leafed washers.
Figure 3:
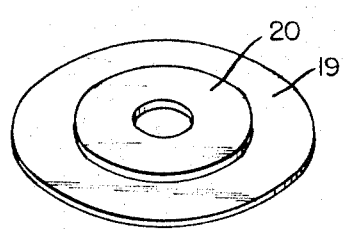
FIG. 3 is a perspective view of the leafed washer used in FIG. 2.

FIG. 2 shows an arrangement essentially similar to that of FIG. 1, except that the simple spring discs 10 and 11 of FIG. 1 are replaced by compound or leafed discs 16 and 17, which are essentially identical except that they are reversed and each is made up of two separate and loose spring sections as shown at 19 and 20 of FIG. 3. The arrangement is otherwise similar to that shown in FIG. 1.

Figure 4:
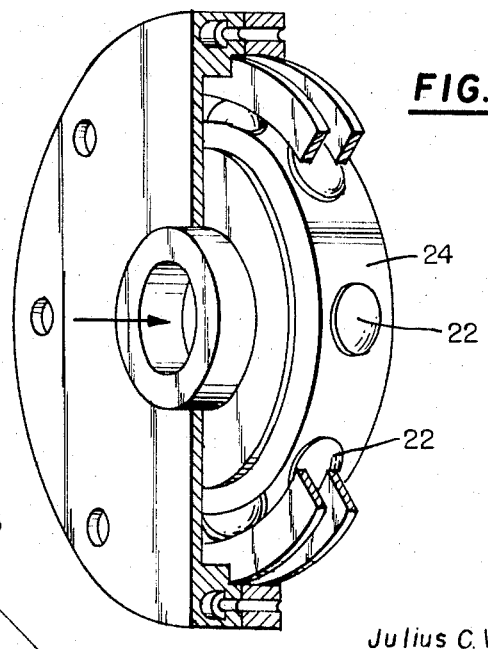
FIGS. 4 is a perspective view, partly in section, of a form of the invention similar to that shown in FIG. 1.

A simpler form of the invention is illustrated in FIG. 4 wherein for light loads the number of ball bearings employed may be reduced. In this case the ball bearings 22 are retained in a symmetrical actuating position by means of a ball retainer 24 as shown. For some snap-lock applications, e.g. for use as fasteners for clothing, this design could be inexpensively manufactured in mass quantities from appropriate plastic materials.

Figure 5:
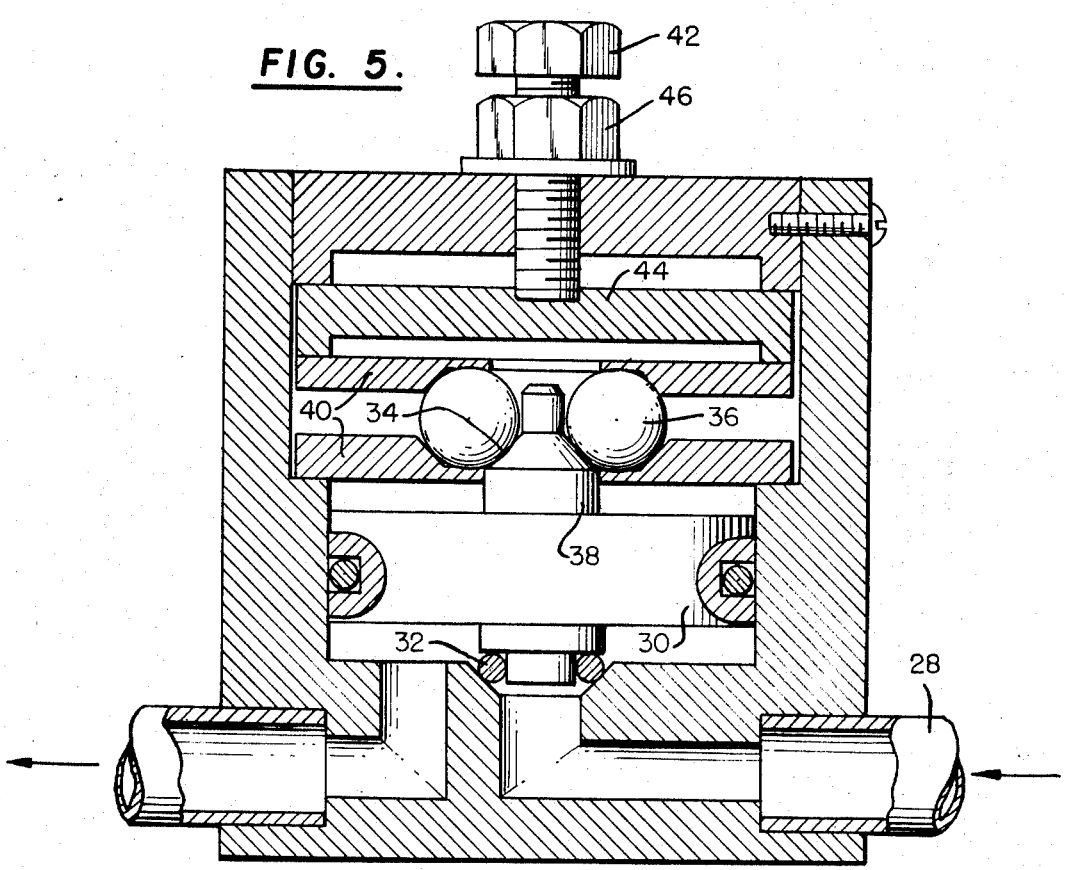
FIG. 5 is a longitudinal sectional view of a modification of the device employed as a pressure relief valve.

FIG. 5 shows an application of the invention to control a pressure relief valve for relieving excessive pressures in a fluid system. The inlet pipe 28 is connected to the fluid system which is to be protected. Excessive pressure in this system will force upwardly the piston 30 thus opening the valve 32 to relieve the pressure. The design can readily be made such that for a slight temporary overpressure, the valve opens only a very short distance and promptly reseats itself; however, for a greater overpressure, the piston is displaced upwardly a sufficient amount so that the cam actuator surface 34 that passed entirely over the center line of the ball bearings 36, which are then in contact with the cylindrical portion 38 which blocks the restoring action of the spring washers 40 so that the valve remains open. After the condition causing the excessive pressure has been corrected, the valve can be restored by a suitable reset mechanism (not shown) and thus resume normal operation. The pressure at which the device operates can be adjusted by means of screw 42 which acts on pressure plate 44 thus providing a variable amount of pressure at the outer rim of the spring washers 40 so that the device will operate at the desired overpressure. When the correct setting has been achieved, lock washer 46 is tightened to retain the setting at this pressure.

Figure 6:
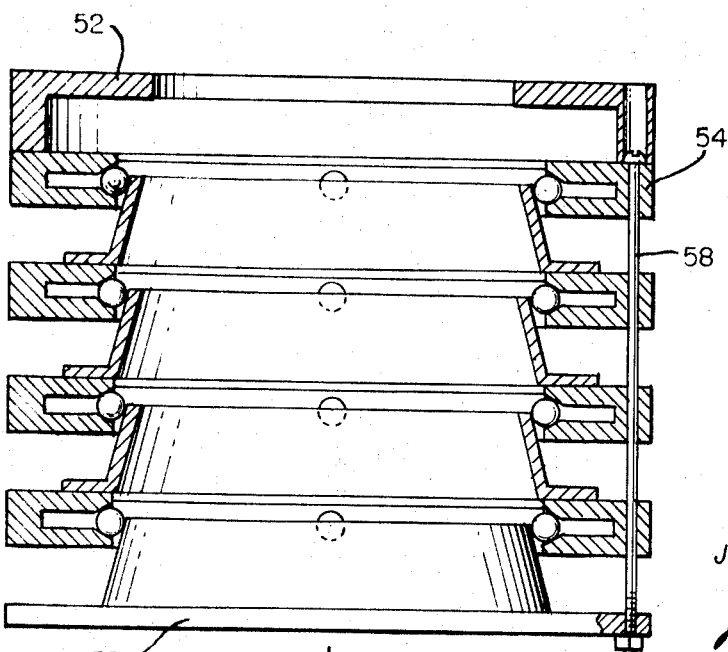
FIG. 6 is a longitudinal sectional view showing the manner in which a number of precision disc springs according to the invention may be stacked to form a single spring having a longer throw.

As shown in FIG. 6, any suitable number of units may be stacked to build up both force and displacement characteristics to meet specific requirements. In this case, the two elements between which spring pressure is to be applied are respectively coupled to the bottom plate 50 and the top unit 52 of the device. The respective spring washers can conveniently be made for this type of operation so that the two washers of each pair are combined into a single unit as shown at 54, having a U-shaped cross-section and thus requiring no additional external holding means for the two washers. To hold the units together, any suitable means may be employed, for example such as a long thin screw 58 passing through a series of loose drill holes in the respective spring units 54 and thus permitting relative spring movement between the ends 50 and 52.

Figure 7:
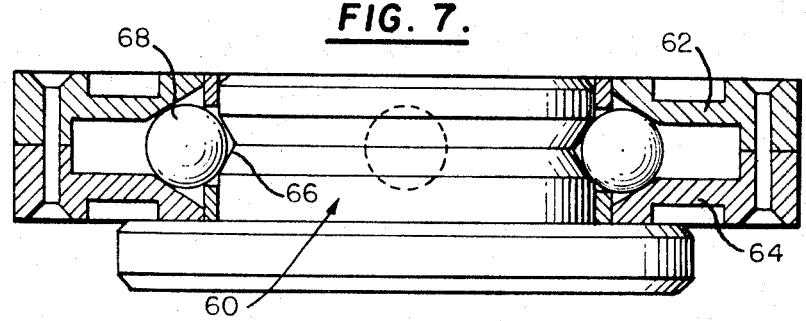
FIG. 7 is a schematic view of the invention employed as a snap-lock fastener.

FIG. 7 shows the invention used as a snap-lock fastener between any two elements which it is decided to fasten together so that a moderate separating force will enable them to be unfastened. In this case the spring washers 62 and 64 are shown as two separate pieces, but they can obviously be made as single units similar to elements 54 of FIG. 6. The cam actuator 60 is provided with a groove 66 which enables the ball bearings 68 to spring back under the action of the washers 62 and 64 when the groove is opposite the center line of the ball bearing, but the application of a separating force similar to the initial uniting force will obviously enable the two parts to be separated. This device could be used as a snap-fastener for garments and could be made of plastic material if desired.

Figure 9:
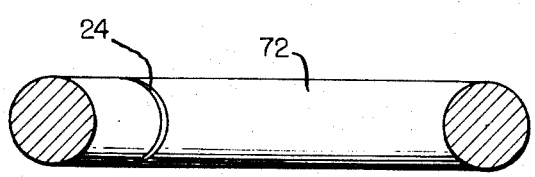
FIGS. 8 and 9 show alternatives to the use of ball bearings for spreading the spring discs.
Figure 8:
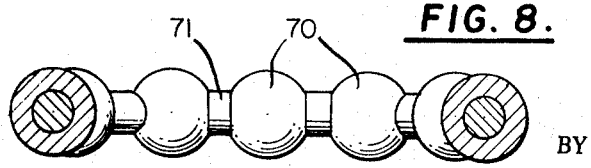

FIGS. 8 and 9 show elements which may be substituted for the ball bearings. In FIG. 8 a number of stiff beads 70 are shown, which may be integral with supporting members 71, or alternatively may be strung upon this member so that they are free to rotate on it. An even simpler form is shown in FIG. 9, where the beads are replaced by a split ring 72. When the cam actuator engages the split ring, the gap or split at 74 is forced farther apart and the ring thus tends to spread the two disc washers very similar to the action of the ball bearings previously described. This is considerably simpler and less expensive than ball bearings, but the action will obviously be more sluggish and may not be suitable for precision spring uses, but can be used for applications where high performance is not required.

Figure 10:
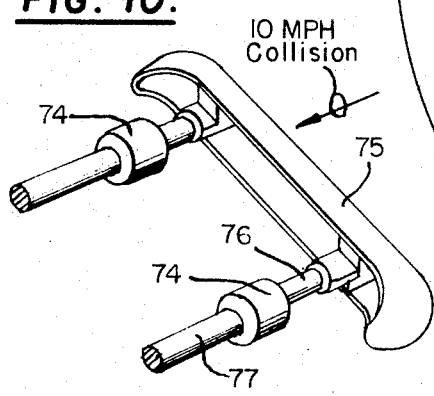
FIG. 10 illustrates how the invention may be used as a shock absorber for automobile bumpers.

FIG. 10 shows the manner in which a modification of the new disc spring washer can be used in an autombile to provide a collision bumper which is capable of obsorbing the shock of a 10-mile per hour impact sufficiently to prevent damage to the vehicle. In this case, the shock obsorbing units 74 would be mounted between the bumper 75 of an automobile and the main body.

Figure 11:
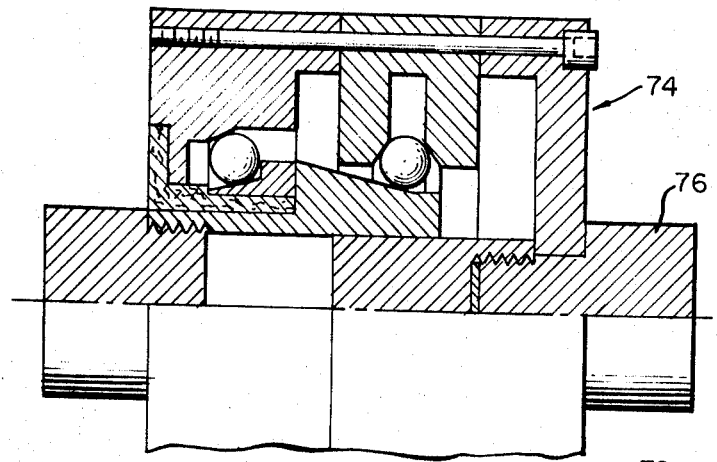
FIGS. 11 and 12 are schematic views partly in section showing the action of the device when used as a shock absorber both before and after a collision.
Figure 12:
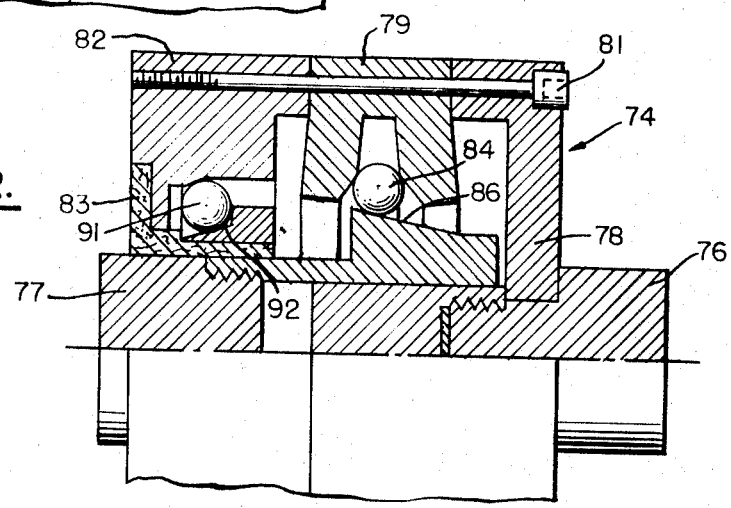

FIG. 11 shows the normal unstressed condition of the energy absorber, and FIG. 12 the condition of the absorber when a shock from the bumper, transmitted through shaft 76, is acting upon the device. The force of the impact causes the bumper and its shaft 76 to move toward the shaft 77 which is fixed to the frame of the vehicle. Element 76 carries with it casing 78 to which is fixed the spring disc arrangement 79, in this case made of very heavy construction to absorb at least a part of the energy required for a 3,000-pound vehicle travelling at ten miles per hour. Also fixed to member 78 by means of screw 81 is a second casing member 82 which carries a brake member 83 which is arranged to be urged into high frictional contact with the shaft 77 on the return stroke of the device in order to prevent too violent a reaction after the collision has occurred. The force of the impact, moving element 76 to the left in FIG. 12, causes the disc springs 79 to carry with them the ball bearings 84 along the cam surface 86, which causes the ball bearings to spread the discs as previously described in connection with the other modifications, thus absorbing the energy of the impact. Immediately thereafter, when the force of the collision has ceased, the disc springs 79 tend to return the bumper to its initial position with great force; to modify this force, the brake member 83 now comes into play, since the return of elements 76, 78 and 82 which are all fixed together causes the series of ball bearings 91 to ride up on cam surface 92, which functions as a brake shoe to press the brake lining 83 into firm contact with the shaft 77 and thus provide considerable friction on the return stroke which tends to absorb the energy and diminish the impact of the return stroke.

I claim:

1. a. A disc spring arrangement comprising
   b. two concentric annular disc spring elements having concentric inner and outer edges,
   c. means for retaining two corresponding circular edges of said two disc elements a fixed distance apart, the other edges being free to flex apart or toward each other,
   d. a wedge unit peripherally engaging the other two adjacent edges of said disc elements at a plurality of points spaced about the circumference of said engaged edges,
   e. cam means movable in a direction to cause radial motion of said wedge units to thereby distort said two disc elements against their spring action to correspondingly cause said free edges to flex apart or toward each other depending on the motion of said cam means.

2. The invention according to claim 1,
   f. said wedge unit comprising a number of ball bearings.

3. The invention according to claim 1,
   f. said wedge unit being a split ring of circular cross-section.

4. The invention according to claim 1,
f. said disc spring elements comprising leaf washers each composed of two annular discs of different size with the inner edge of the larger one overlapping the outer edge of the smaller one.

5. The invention according to claim 1,
f. and screw means for applying variable pressure to the disc edges held at said fixed distance so as to adjust the spring pressure exerted by the free edges on the cam means.

6. The invention according to claim 5,
g. said cam means being movable in a direction parallel to the common axis of said disc elements and having a conically tapered section in contact with said wedge unit in one axial position and a cylindrical section in contact with the wedge unit in another axial position of the cam means,
h. said cylindrical section being of the same diameter as the base portion of said conical section anc connected to said base portion.

7. The invention according to claim 1,
f. said cam means being movable in a direction parallel to the common axis of said disc elements to cause said radial motion of said wedge unit and having a generally cylindrical exterior surface engaging said wedge unit,
g. said cam means having an annular V-shaped groove into which said wedge unit fits in the fully engaged position of the cam unit to provide a snap-lock action between said cam means and the disc-wedge assembly.

8. The invention according to claim 1,
f. one disc of the sub-assembly of sections b) and c) having fixed thereto a cam unit whereby a number of such combined cam-disc assemblies can be stacked to provide a multiple stacked unit.

9. The invention according to claim 1,
f. said cam means being attachable to a large impact unit such as an automobile bumper so that the disc elements absorb the shock of impact applied through said cam means,
g. and a one-way friction brake device attached to said disc washer elements and arranged to frictionally absorb the energy stored in said disc elements upon cessation of the impacting force.

* * * * *